(12) United States Patent
Mackert (10) Patent No.: US 8,069,645 B2
(45) Date of Patent: Dec. 6, 2011

(54) LINK CHAIN

(75) Inventor: Michael Mackert, Rüthen (DE)

(73) Assignee: Kintec-Solution GmbH, Rietberg (DE)

( * ) Notice: Subject to any disclaimer, the term of this patent is extended or adjusted under 35 U.S.C. 154(b) by 0 days.

(21) Appl. No.: 12/673,077

(22) PCT Filed: Aug. 20, 2008

(86) PCT No.: PCT/EP2008/060902
§ 371 (c)(1),
(2), (4) Date: Jun. 28, 2010

(87) PCT Pub. No.: WO2009/024588
PCT Pub. Date: Feb. 26, 2009

(65) Prior Publication Data
US 2011/0203248 A1    Aug. 25, 2011

(30) Foreign Application Priority Data
Aug. 22, 2007 (DE) .......................... 10 2007 039 680

(51) Int. Cl.
*F16G 13/06* (2006.01)
*A47C 1/027* (2006.01)

(52) U.S. Cl. ............ 59/85; 474/210; 474/230; 474/240; 474/245; 403/103; 403/378; 297/354.12

(58) Field of Classification Search .................. 59/7, 85; 474/210, 230, 240, 245; 403/103, 378; 297/354.12
See application file for complete search history.

(56) References Cited

U.S. PATENT DOCUMENTS
4,290,762 A * 9/1981 Lapeyre ........................ 474/210

(Continued)

FOREIGN PATENT DOCUMENTS
DE    808151 B    7/1951
(Continued)

OTHER PUBLICATIONS

International Search Report and Written Opinion of the International Searching Authority from corresponding Patent Cooperation Treaty (PCT) Application No. PCT/EP2008/060902, mailed Dec. 4, 2008.

(Continued)

*Primary Examiner* — David Jones
(74) *Attorney, Agent, or Firm* — Gardner, Linn, Burkhart & Flory, LLP (57) ABSTRACT

The invention relates to a link chain having two or more rows of chain elements, wherein the chain elements of one row are rotatably connected to those of the adjacent row in the chain plane in such a way that each chain element has two rotational axes, of which in each case one of the two rotational axes belongs to two different chain elements in adjacent rows, and that the chain elements of one row are connected to one another by means of toothed devices at their ends in such a way that the chain is flexible in the chain plane. The chain elements at one end of the link chain are likewise provided, at their outer side, with a toothed device, which is in engagement with an actuator. The actuator is a pneumatic actuator, a hydraulic actuator, an electromotive actuator or a manual drive actuator. The actuator may have a latching fitting, wherein the latching fitting is provided with a toothed surface that is in engagement with a toothed surface of a chain element in one row. The latching fitting may also be provided with a latching lug which is pivotably connected thereto and which can be locked in different angle positions. The latching fitting may also have a connection plate that has a toothed surface which is in engagement with a toothed surface of a chain element of the other row.

20 Claims, 9 Drawing Sheets

U.S. PATENT DOCUMENTS

| | | | |
|---|---|---|---|
| 4,505,693 A * | 3/1985 | Moss | 474/240 |
| 4,865,387 A | 9/1989 | Lipparini et al. | |
| 2009/0309403 A1 | 12/2009 | Mackert | |
| 2010/0141005 A1 * | 6/2010 | Mackert | 403/103 |

FOREIGN PATENT DOCUMENTS

| | | |
|---|---|---|
| DE | 1033382 B | 7/1958 |
| DE | 2059143 A1 | 6/1971 |
| DE | 7831088 U1 | 2/1979 |
| DE | 8807226 U1 | 9/1988 |
| DE | 29606367 U1 | 8/1996 |
| DE | 202005011386 U1 | 9/2005 |
| DE | 102006058948 A1 | 6/2008 |
| EP | 0027660 A | 4/1981 |
| FR | 2736250 A1 | 1/1997 |
| GB | 1339018 | 11/1973 |

OTHER PUBLICATIONS

International Preliminary Report on Patentability from corresponding Patent Cooperation Treaty Patent Application No. PCT/EP2008/060902 mailed Mar. 11, 2010.

* cited by examiner

LINK CHAIN

The invention relates to a link chain having two or more rows of chain elements and, in particular, wherein the chain elements of one row are rotatably connected to those of the adjacent row in the chain plane such that each chain element has two rotational spindles, of which each one of the two rotational spindles belongs to two different chain elements in adjacent rows, and that the chain elements of one row are connected to each other by means of toothed drives of their ends such that the chain is flexible in the chain plane.

A continuously variable surface having a similar construction is known from DE 20 59 143A. The surface described therein is divided into several rows of surface elements, wherein the surface elements of one row are rotatably connected to those of an adjacent row in the surface plane such that each surface element has two pivot points, of which each one of the two pivot points belongs to two different surface elements in adjacent rows. The surface elements in the same row are connected to each other by movement transfer parts such that the surface is flexible in the plane thereof. This surface renders it possible to produce continuously variable, curved surfaces by regulating elements which are disposed merely at one end of the respective surface.

SUMMARY OF THE INVENTION

The present invention provides a link chain, in which the chain not only permits a continuous variation of its curvature, but also permits the convenient adjustment of the curvature and thus usage in furniture.

A link chain, according to an aspect of the invention, includes two or more rows of chain elements. The chain elements of one row are rotatably connected to the chain elements of the adjacent row in a chain plane such that each chain element has two rotational spindles, of which each one of the two rotational spindles belongs to two different chain elements in adjacent rows, and that the chain elements of one row are connected to each other by means of toothed drives of their ends such that the chain is flexible in the chain plane. The link chain further includes an actuator, wherein, on one end of the link chain, the chain elements are provided on their outer side with a toothed drive which are in engagement with the actuator. The actuator may be a pneumatic, hydraulic, electromotive or manual drive. The actuator includes a latching fitting, wherein the latching fitting is provided with a connection plate which is adapted to be connected with a stationary surface. The connection plate has on its outer side a toothed drive which is in engagement with the toothed drive of a chain element in one of the rows. The latching fitting is provided with a latching plate which is pivotally connected to the connection plate, wherein the latching plate can be locked in various angular positions and has on its outer side a toothed drive which is in engagement with the toothed drive of a chain element in the other one of the rows. The connection and latching plates are concentrically mounted with a joint spindle.

By virtue of the fact that the chain elements at one end of the link chain are likewise provided on their outer side with a toothed drive which are in engagement with the actuator, it is possible in a convenient manner to vary the link chain not only in terms of curvature by means of a unilateral action by the actuator, but also to maintain the changed adjustment even after adjustment has been completed. The actuator may have a self-locking action or latching function, so that a changed adjustment is maintained even after adjustment has been completed.

The actuator may be in engagement with the chain elements such that they are rotated relative to each other by means of the adjustment of the actuator. The actuator can comprise a pneumatic actuator, a hydraulic actuator, an electromotive actuator or a manual actuator.

This permits various possible applications, in particular in the construction of so-called reclining chairs. Chairs of this type have a backrest which can be pivoted with respect to a seat surface, and a leg support which can be pivoted outwards, wherein the chair can be pivoted between a sitting position and a reclining position. This provides an adjustment of the position between a "normal" upright sitting position and an approximately horizontally aligned reclining position. The backrest and/or head supports are optionally also adjustable and are coupled in part to the adjusting movement of the chair or can be adjusted manually independently thereof. This type of chain is thus suitable for transferring the adjusting movement and for maintaining an adjusted position of the chair. It is thus possible in a convenient and elegant manner to produce chairs which permit a large number of adjustable positions.

It is also conceivable to use the embodiments of the link chain disclosed herein in sofas, or the like, for the adjustment of head supports or armrests.

The actuator may comprise a latching fitting. This type of latching fitting may be used where the structural dimension is as small as possible. In addition, the latching fitting may also have a large holding force and at the same time the largest possible latching adjustment range. In particular, the latching fitting may also be of a sufficiently small construction that it can be used in seats and recliners.

Therefore, in an embodiment, a latching fitting is used which is provided with a connection plate, which on its outer side comprises a toothed drive which is in engagement with the toothed drive of a chain element in one of the rows, and the latching fitting is provided with a latching plate which is pivotally connected thereto, can be locked in various angular positions and which is in engagement with the toothed drive of a chain element of the other of the rows and has a toothed drive which is disposed concentrically with respect to the joint spindle. A detent pawl may be provided which is mounted rotatably on the connection plate and engages into the latching plate in the latching position, wherein in the disengaged position the detent pawl is held by means of a spring and in the engaged position is influenced by means of the same spring. In this manner, only one stop cam needs to be provided on the latching plate for disengaging the detent pawl by cooperating with a disengagement lug and the detent pawl has an engagement surface which cooperates with the toothed drive for engagement purposes.

Therefore, it is additionally possible to dispense with the typical pressure cam for engagement purposes. Its function is thus assumed by the toothed drive itself. Therefore, the number of teeth does not need to be reduced. On the contrary, it is possible to form the toothed region so as to be particularly large. Furthermore, the spacing between the detent pawl and the latching plate can be reduced, as no pressure lug which protrudes over the toothed drive is present or required.

During movement in the disengaged position of the detent pawl, the toothed drive comes into contact with the engagement surface on the detent pawl and urges it into the engaged position. In the engaged position, the toothed drive engages merely into the latching teeth of the detent pawl. Therefore, the engagement surface can be formed eccentrically with respect to the rotational spindle of the detent pawl. The engagement surface can also be defined on the one hand by at least one latching tooth and on the other hand by a disengagement lug.

The "active" region of the actual engagement surface can be formed on the side of the disengagement lug facing the toothed drive. The spring of the latching fitting has a dual function. On the one hand, it holds the detent pawl in the engaged position in latching engagement with the toothed drive. On the other hand, it holds the detent pawl in a fixed manner in the disengaged position.

In accordance with a further embodiment of the latching fitting, the detent pawl may include a latching recess on the side remote from the toothed drive, into which the spring engages when the detent pawl is in the disengaged position, which holds the detent pawl in a fixed manner.

In addition, on the side remote from the toothed drive the detent pawl can comprise a bearing surface, against which the spring lies when the detent pawl is in the engaged position.

The latching recess and the bearing surface can be disposed in an adjacent manner, so that small movements of the pawl actually differ between the engaged position and the disengaged position. In turn, this permits a reduction in the overall installation size. The latching recess and the bearing surface can be separate from a sharp edge, so as to produce a "snapping" switch-over.

In accordance with an embodiment, the latching recess comprises a surface which is adapted to the shape and position of the front region of the spring, so that when the detent pawl is in the engaged state the spring lies approximately flat at or on the surface. Therefore, in spite of a simple design of the detent pawl and the spring, the spring is able to fixedly hold the detent pawl in an effective manner.

The spring may be held in a clamping manner on a cover, e.g., for the joint region of the latching fitting.

The detent pawl can be formed in a crescent-shaped manner. The rotational spindle of the detent pawl may be disposed asymmetrically, so that a favourable lever geometry is achieved.

Figure 1:
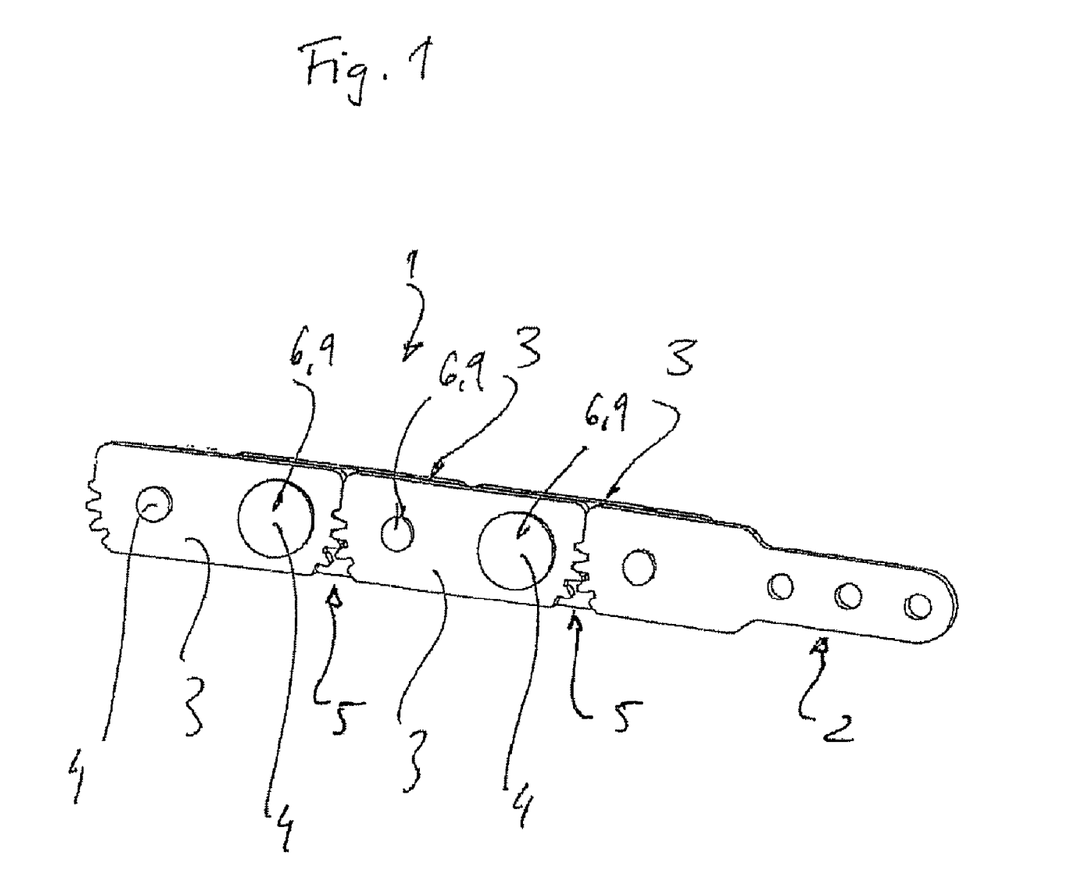
FIG. 1 shows a link chain in an approximately linear position in a perspective view from the side without an actuator.
Figure 2:
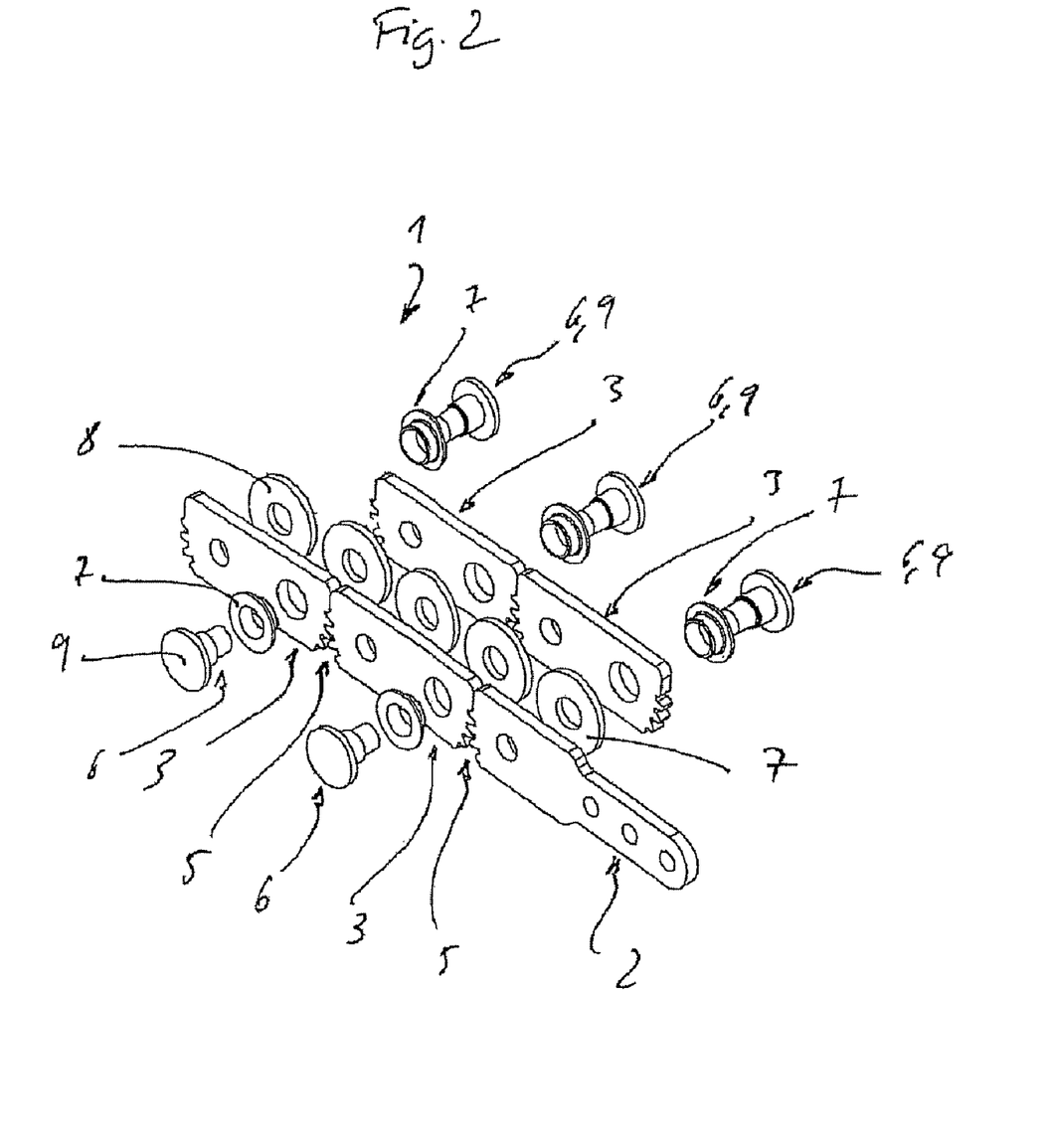
FIG. 2 shows the link chain of FIG. 1 in a corresponding perspective exploded view.
Figure 3:
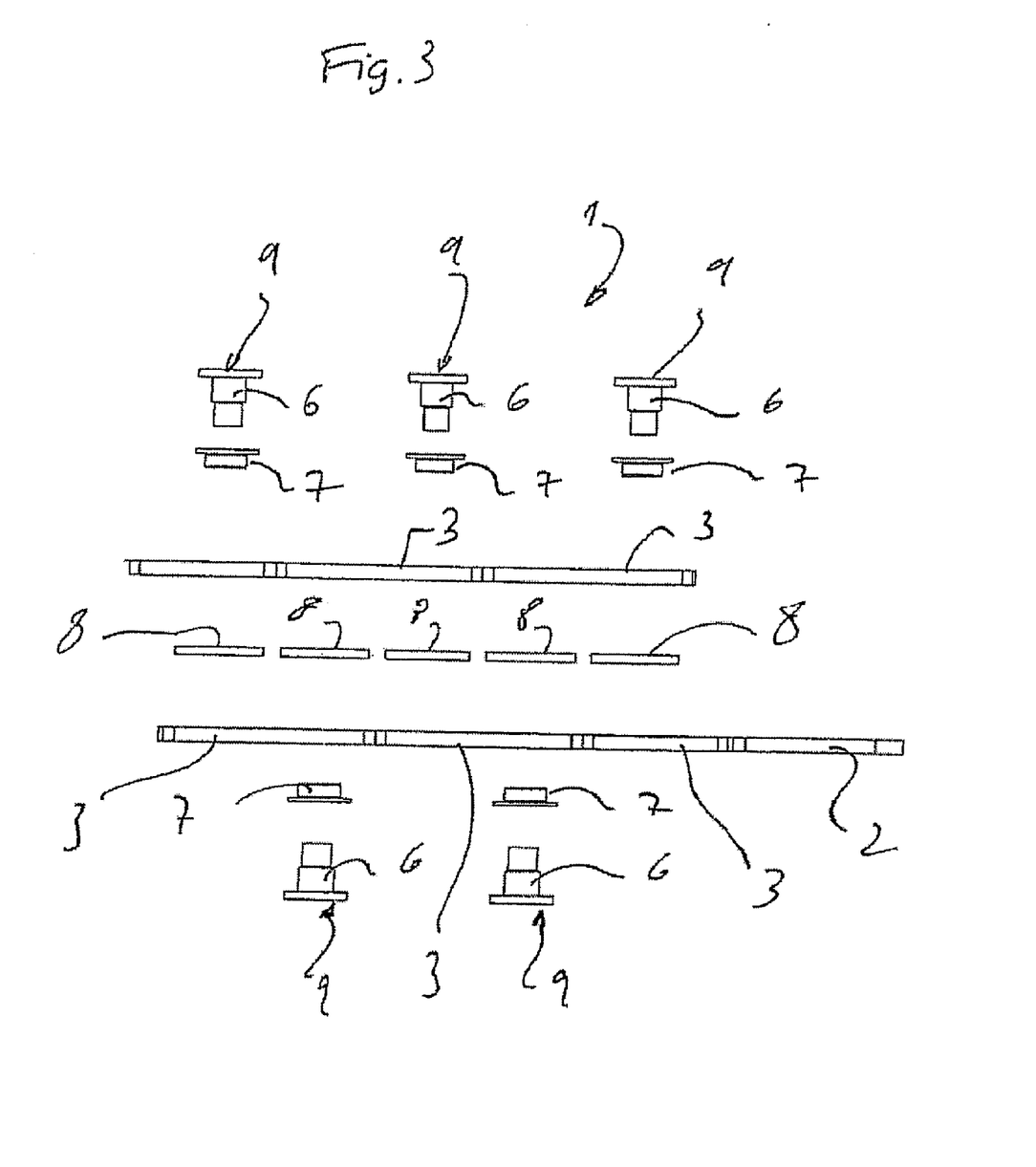
FIG. 3 shows a plan view of the link chain of FIG. 1.
Figure 4:
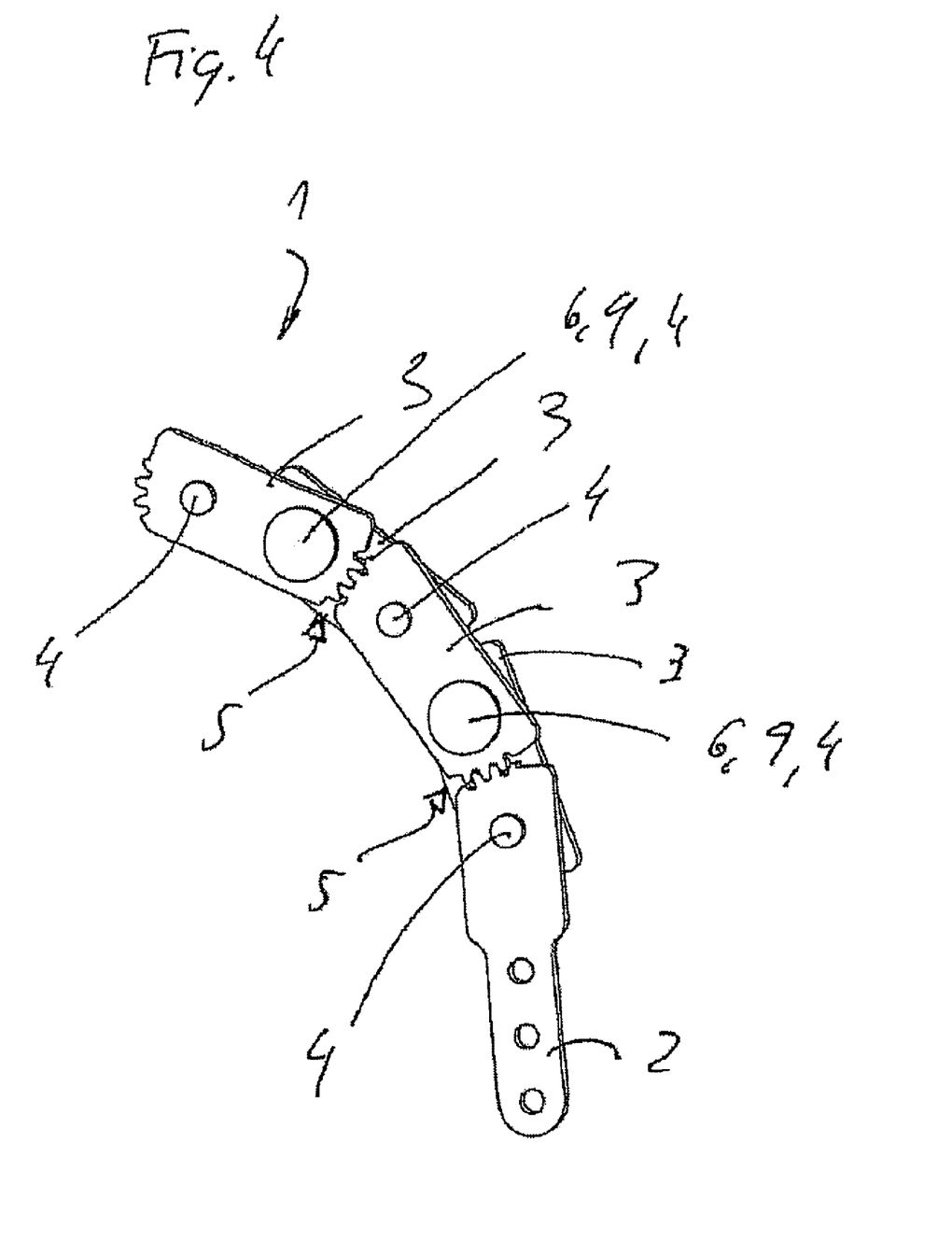
FIG. 4 shows the link chain of FIG. 1 in a curved position in a perspective view from the side.

A particularly compact and at the same time simple embodiment of the actuator region having a large holding force is obtained if, in the starting position of the link chain in a linear arrangement without curvature as shown in FIG. 1, the rotational spindle of the latching plate, the rotational spindle of the detent pawl and the longitudinal centre lines of the two plates and the rotational spindles of the chain elements lie on a common plane.

The rotational spindles of the chain elements may include a synthetic material disk and a synthetic material bushing. In particular, the synthetic material disk may be disposed between the respective chain elements of different rows. In so doing, it expediently has a rotational spindle passing through it. Furthermore, it is expedient if the synthetic material bushing is disposed between the rivet and the chain element. In so doing, it has the rotational spindle passing through it and is pressed against the chain element. The rotational spindles may be riveted from alternating sides of the row.

A further embodiment of the invention is achieved if the actuator comprises an electromotively driven worm gear which effects an adjustment of the penultimate chain element relative to the fixed last chain element. A worm gear is able to absorb and transfer large forces and have a self-locking action.

These and other objects, advantages and features of this invention will become apparent upon review of the following specification in conjunction with the drawings.

BRIEF DESCRIPTION OF THE DRAWINGS

Further details and advantages will be apparent from the description hereinafter of an exemplified embodiment with reference to the drawing, in which.

DESCRIPTION OF THE PREFERRED EMBODIMENT

Referring now specifically to the drawings, and the illustrative embodiments depicted therein, a link chain which is designated in its entirety by the reference numeral 1 may be used with a latching fitting 11 for accommodating movement.

The link chain 1 without a latching fitting 11 will be explained first. The link chain 1 is made up of two rows of chain elements. In principle, each row includes an end chain element 2 and several chain elements 3. The end chain elements 2 of the rows are disposed on respectively remote ends of the link chain 1.

In the embodiment illustrated in FIG. 1, the end chain element 2 has been omitted from one end. In this case, the latching fitting 11 described hereinafter is used as an actuator.

The chain element 2 or chain elements 3 of one row are rotatably connected to those of the adjacent row in the chain plane via rotational spindles 4. Each chain element 3 has two rotational spindles 4, of which each one of the two rotational spindles 4 belongs to two different chain elements 3 in adjacent rows. The end chain element 2 has only one rotational spindle 4 in the actual link chain.

The chain elements 2, 3 of one row are connected to each other by means of toothed drives 5 of their ends, so that the chain is flexible in the chain plane and a movement introduced at the end is transferred to the adjacent chain elements 3, so that the chain can be adjusted in curvature in the chain plane.

In the present example, the rotational spindles 4 are produced by a riveting assembly formed of rivets 6. The rivets 6 comprise a widened, disk-shaped head 9 which urges a synthetic material bushing 7 against the surface of the respective chain element of one row. At the same time, the synthetic material bushing 7 engages into the corresponding bore in the respective chain element and has the rivet 6 passing through it. The rivet 6 likewise passes through the respective other chain element of the adjacent row, wherein the rivet 6 passes through a synthetic material disk 8 which is disposed between the respective chain elements 3 of the rows. The synthetic material bushing 7 and the synthetic material disk 8 may each be produced from elastic material.

Figure 5:
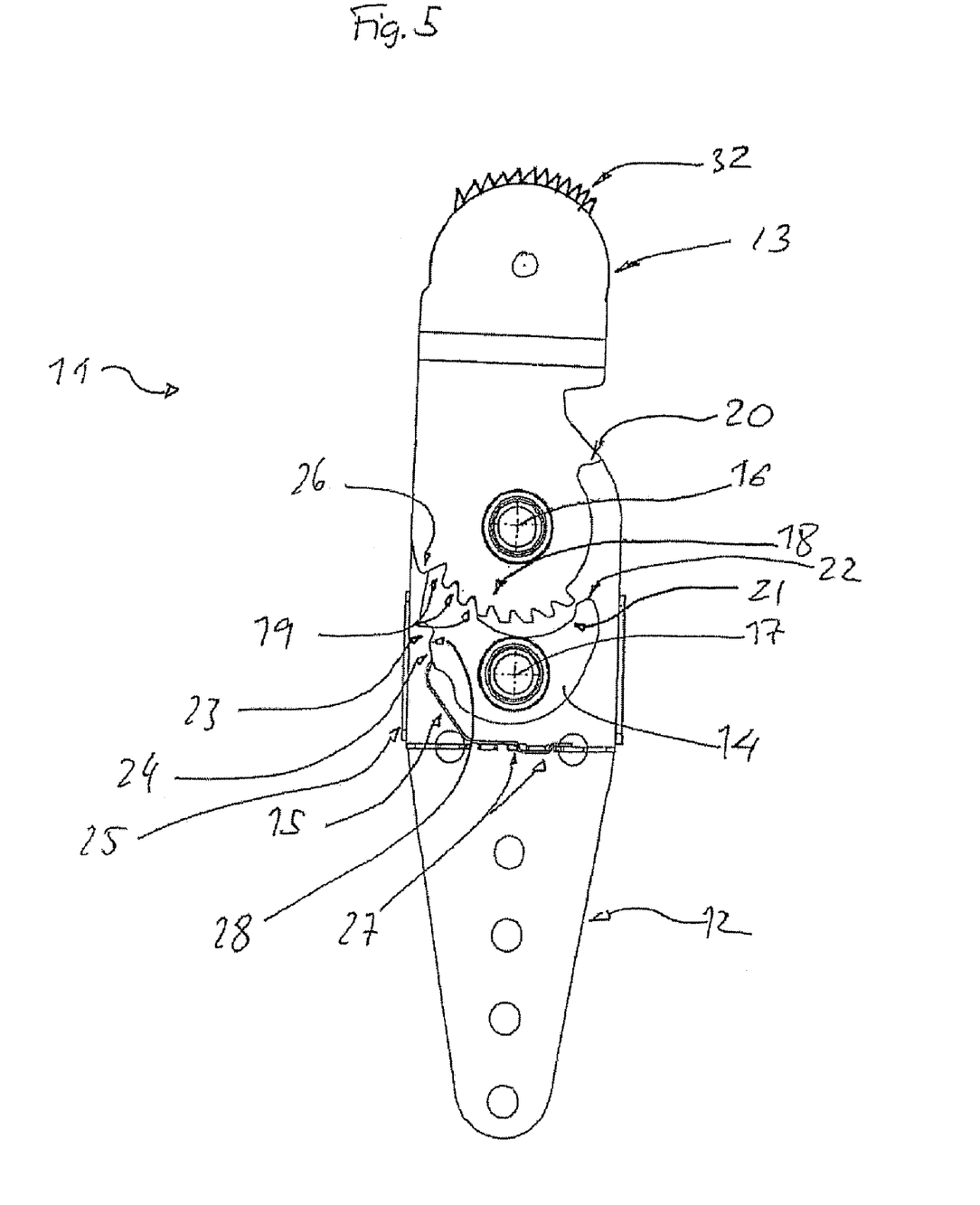
FIG. 5 shows a plan view of a latching fitting in the engaged end position, wherein the cover is cut open to reveal internal details.
Figure 6:
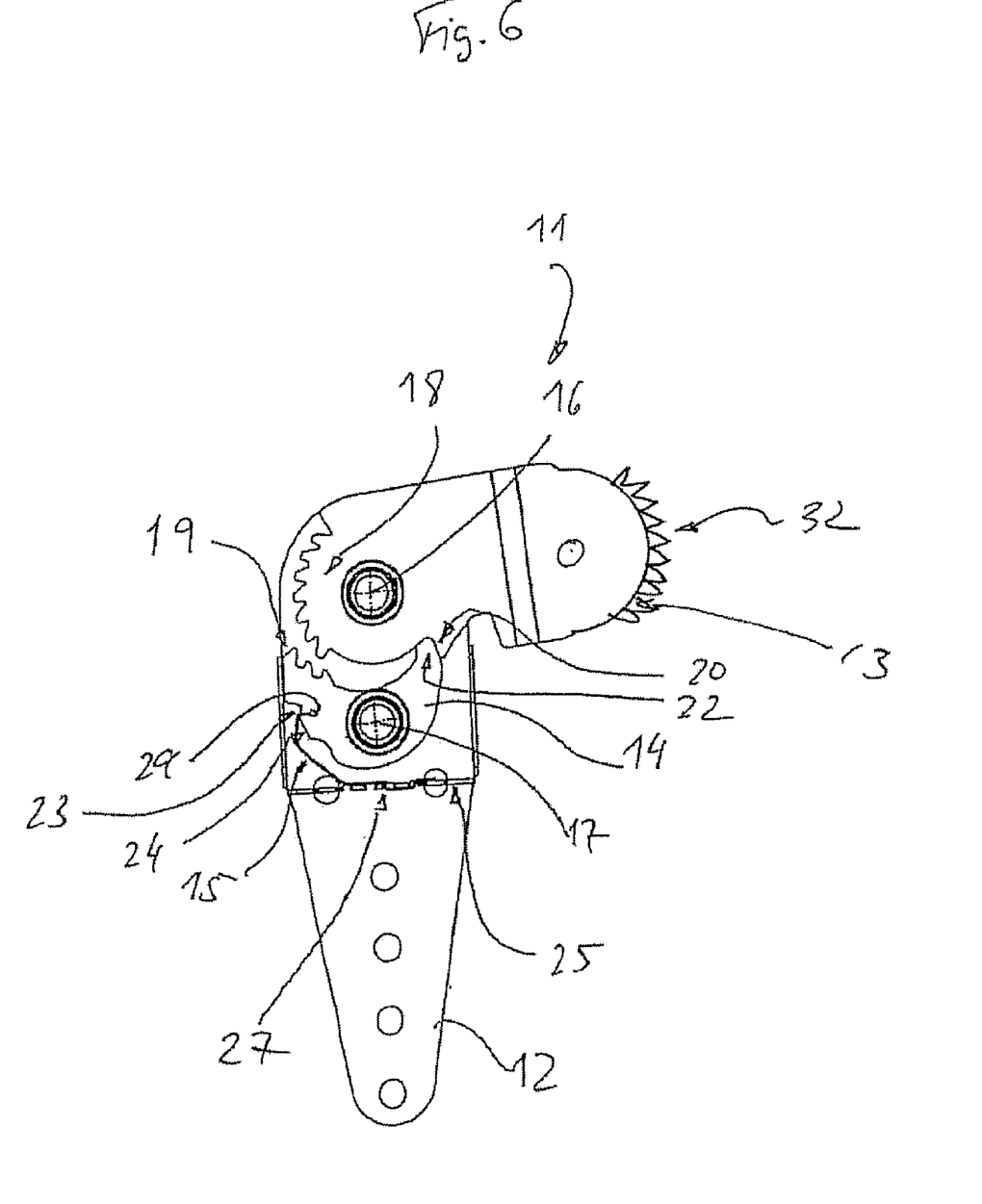
FIG. 6 shows the latching fitting of FIG. 5 in the disengaged position.
Figure 7:
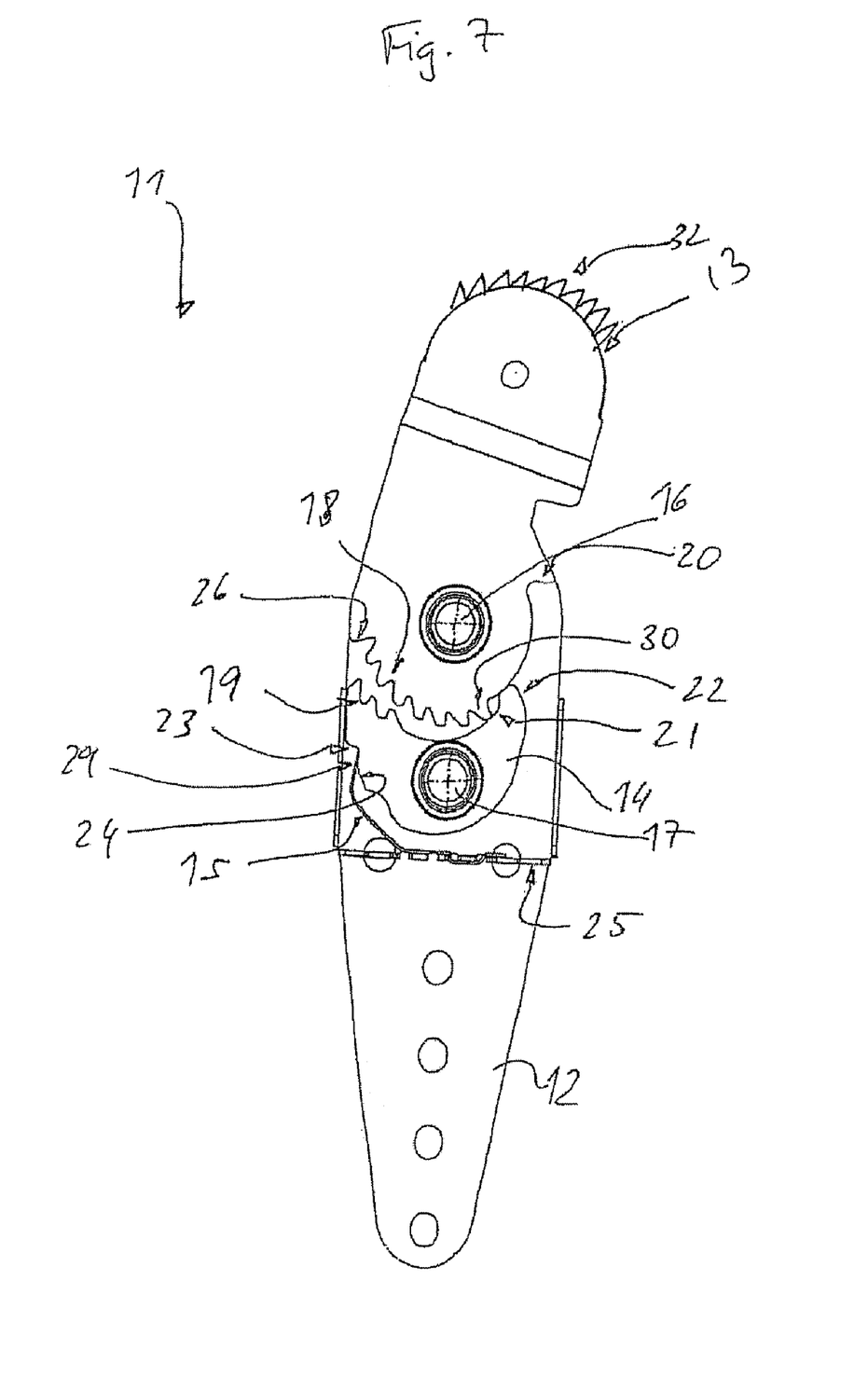
FIG. 7 shows the latching fitting of FIG. 5 in the position during engagement of the detent pawl.

In the present exemplary embodiment, illustrated in FIGS. 1 through 4 the actuator is a latching fitting. FIGS. 5 through 7 illustrate in plan view in various positions the latching fitting which is designated in its entirety by the reference numeral 11 and which is used in the illustrated embodiment, wherein the cover is cut open and only the sidewalls 25 thereof are indicated.

The structure and the function of the latching fitting 11 are described initially without the interaction with the link chain 1, in order to gain a better understanding of the mode of function. The latching fitting comprises a connection plate 12 for attachment to the stationary part of an item of furniture, and a latching plate 13 for attachment of the actual link chain 1.

The connection plate 12 may include two bores which are not visible in FIGS. 5 through 7, in order to receive two rivets 16, 17, or the like, in order on the one hand to attach the cover and on the other hand to form the respective rotational spindles 16, 17 of the latching plate 13 and the detent pawl 14. These rivets 16, 17 can be provided with suitable sleeves, etc., in order to form the rotational spindles.

At one end, the latching plate 13 includes a toothed drive 18 which is disposed concentrically with respect to its rotational spindle 16 or the joint spindle of the latching fitting 11. On one side of the toothed drive 18, a stop 26 is provided for limiting the movement of the plates with respect to each other. If the outer tooth of the detent pawl 14 lies against the stop 26 (FIG. 5), then the latching fitting is located in the starting position. On the other side, a stop cam 20 is provided separated or spaced apart by means of a non-toothed region.

The detent pawl 14 is disposed opposite the toothed drive 18 and comprises an approximately crescent-shaped configuration which is mounted eccentrically on the rivet 17 as a rotational spindle. On one side and lying opposite the toothed drive 18, several latching teeth 19 are provided which are configured in such a manner that together with the toothed drive 18 they effect a self-locking action and perform a latching function. On the other side of the detent pawl 14, a disengagement lug 22 is provided separated or spaced apart by means of a non-toothed region.

In the engaged position of the detent pawl 14 (FIG. 5), three latching teeth 19 of the detent pawl 14 engage in each case into the opposite toothed drive 18 of the latching plate 13. In order to maintain this engagement, a spring 15 is provided which holds or influences the detent pawl 14 in the engaged position. To this end, the spring 15 presses with its tip onto a bearing surface 24 on the rear side of the detent pawl 14. The spring 15 is a leaf spring and is fixed in a clamping manner in corresponding slots 27 of the sidewalls 25 of the cover.

The rotational spindle 16 of the latching plate 13, the rotational spindle 17 of the detent pawl 14 and the longitudinal centre lines of the two plates 12, 13 and the rotational spindles 4 of the chain elements 3 lie on one line in the linear starting position illustrated in FIG. 5.

In order to adjust the link chain 1 or the latching fitting 11, the latching plate 13 is rotated clockwise with respect to the connection plate 12.

If the latching plate 13 is rotated clockwise with respect to the connection plate 12 until the stop cam 20 comes to lie against the disengagement lug 22 and furthermore until it presses against it, then the detent pawl 14 is disengaged against the resilient force of the spring 15. This position is illustrated in FIG. 6.

Upon disengagement, the position at which the spring 15 contacts the rear side of the detent pawl 14 changes. In order to keep the detent pawl 14 in the disengaged position, the spring 15 slides with its tip into a latching recess 23 next to the bearing surface 24 on the rear side of the detent pawl. The transition between the latching recess 23 and the bearing surface 24 is formed by a sharp edge 28, so that a certain "snapping" action is associated with the procedure. This edge 28 transitions into an approximately planar surface 29 of the latching recess 23 which is adapted to the configuration and position of the front region of the spring 15, so that it does not lie solely with its tip against the detent pawl 14, as is the case in the engaged state, but rather lies with the front region approximately flat against or on the surface 29. Therefore, without it being necessary for the tip of the spring 15 to be machined in a particular manner or to be bent in a costly manner, the detent pawl is fixedly held in a reliable manner by the spring and the dual function of the spring is ensured.

In order then to engage the detent pawl 14, the latching plate 13 or the link chain 1 is rotated back anticlockwise with respect to the connection plate 12. In this case, the toothed drive 18 or its first tooth 20 comes into contact with the engagement surface 21.

The engagement surface 21 is defined on the one hand by a latching tooth 19 and on the other hand by the disengagement lug 22 or its rear side.

The actually "active" region of the engagement surface 21 which is responsible for the final engagement is formed at the base of the rear side of the disengagement lug 22 or on the side of the disengagement lug 22 facing towards the toothed drive 18. This surface extends in the direction of the toothed drive 18 to such an extent that in the latching operation the toothed drive 8 is moved past the engagement surface 21 or rear side of the disengagement lug 22 without any contact, but in the changed position when the detent pawl 14 is in the disengaged state, the first tooth 30 of the toothed drive 18 comes to lie against the detent pawl 14. The engagement surface 11 is formed in an eccentric manner with respect to the rotational spindle 17 of the detent pawl 14, so that the tooth 30 is formed in the same manner as all other teeth and can be used in the latching operation.

Figure 8:
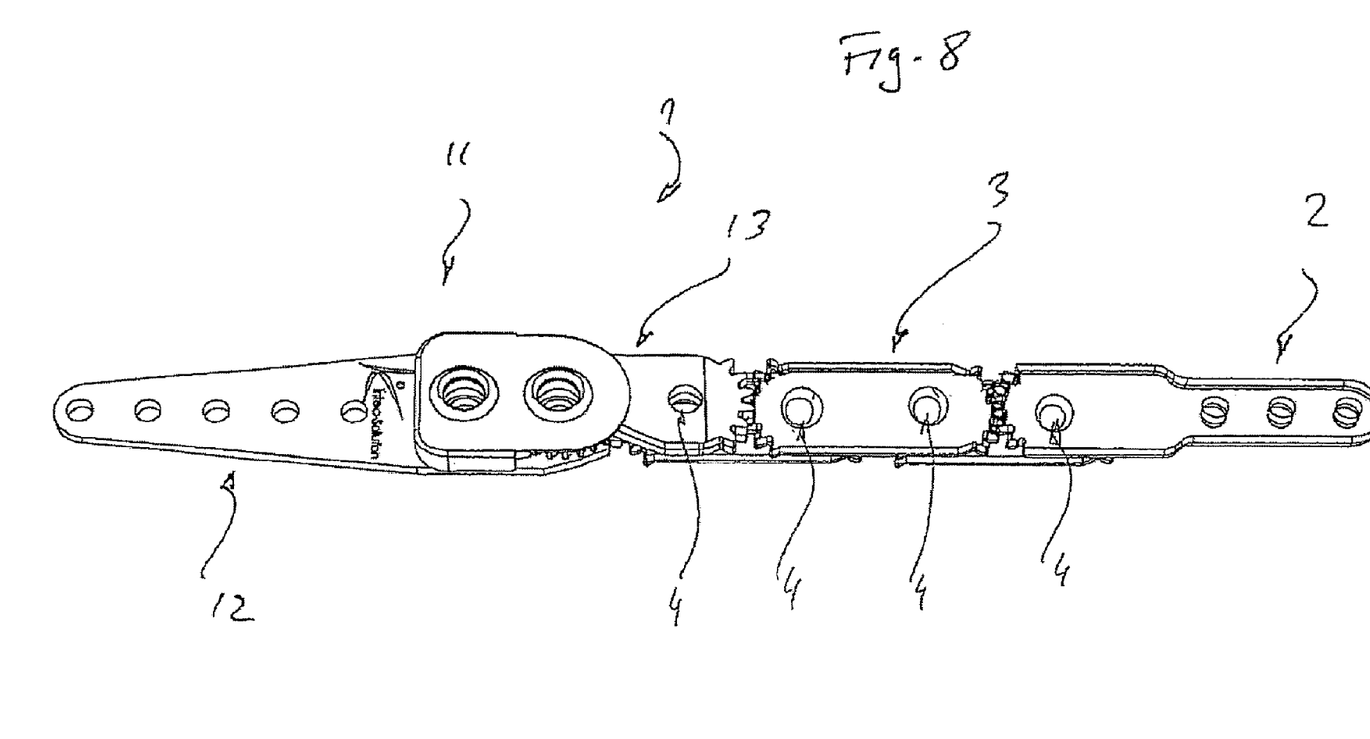
FIG. 8 shows the complete link chain including the latching fitting in a perspective view from the side in the linear starting position.
Figure 9:
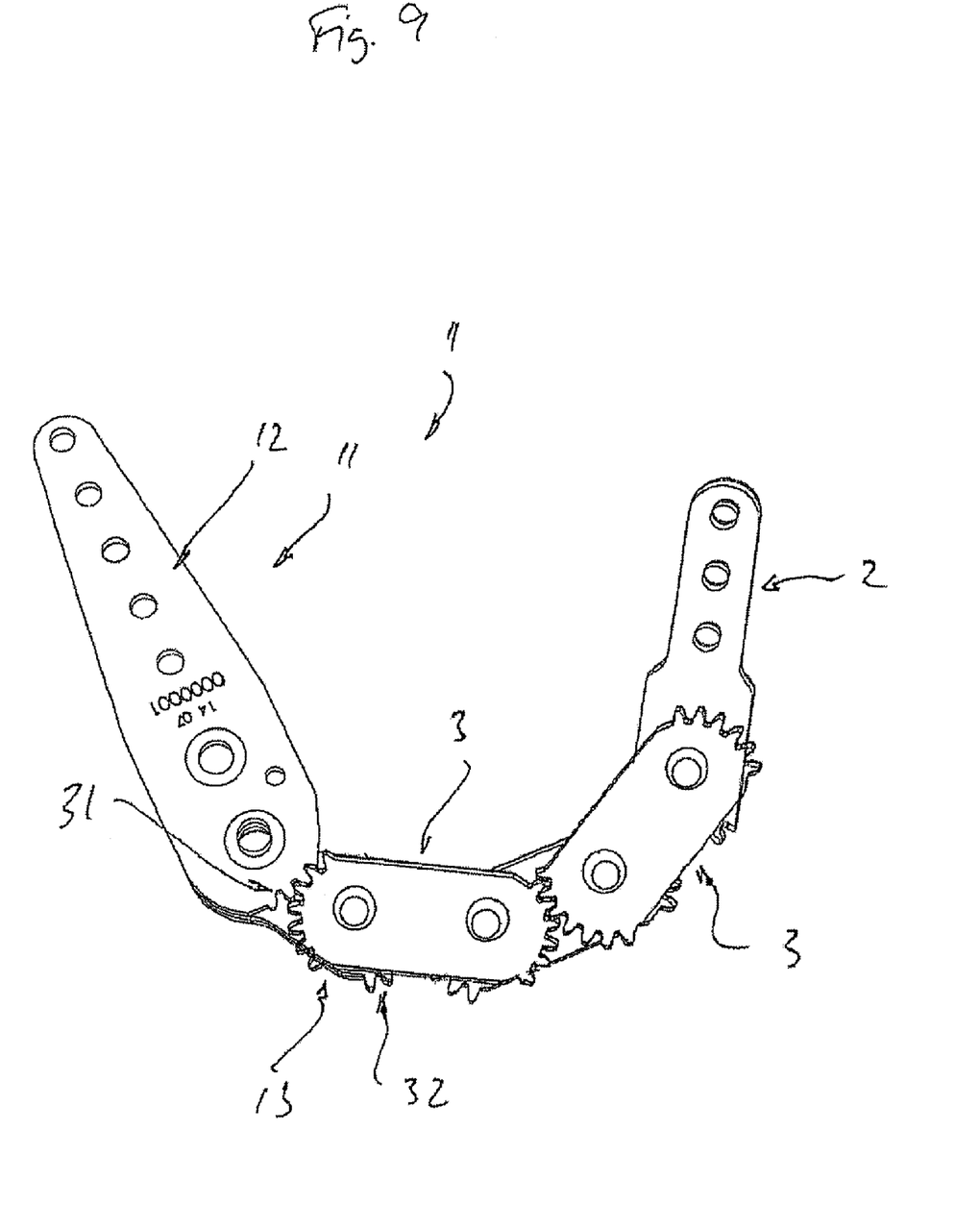
FIG. 9 shows the complete link chain of FIG. 8 in a curved position in a perspective view from the rear side.

The complete link chain 1 including the latching fitting 11 is illustrated in FIGS. 8 and 9. During interaction with the link chain 1, the latching fitting 11 forms one end of the link chain 1. The latching plate 13 thus forms the last chain element 3' on the corresponding side and the connection plate 12 forms the corresponding end chain element 2'. In other words, the latching plate 13 interacts with the penultimate chain element 3 and the connection plate 12 interacts with the last chain element 3 of the actual link chain 1.

In order to interact with the actual link chain 1 or in order to transfer the relative movement, the connection plate 12 thus comprises on its outer side a toothed surface 31 (FIG. 5) which is in engagement with the toothed surface of the last chain element 3 in one row, i.e., they jointly form a toothed drive 5.

In order to interact with the actual link chain 1 or in order to transfer the relative movement, the latching plate 13 thus comprises on its outer side a toothed surface 32 (FIG. 8) which is in engagement with the toothed surface of the chain element 3 in the other row, i.e., they jointly form a toothed drive 5.

Therefore, by reason of the introduction of a relative movement between a fixed end chain element 2 or connection plate 12 and a chain element 3 or latching plate 13 of the latching fitting 11, the link chain 1 can be varied in terms of its curvature by the application of a force. The chain maintains the adjusted curvature until the latching fitting 11 is further latched or is unlatched.

Therefore, the chain can be used, e.g., in the reclining chairs stated above. By reason of the entire weight force of the users, e.g., the leg support can be adjusted when pivoting the chair from one position to another, but it remains in the adjusted position in spite of the lower weight force of the legs lying thereon. The chain may also be used for the adjustment of head supports, armrests, or the like.

Changes and modifications in the specifically described embodiments can be carried out without departing from the principles of the invention which is intended to be limited only by the scope of the appended claims, as interpreted according to the principles of patent law including the doctrine of equivalents.

LIST OF REFERENCE NUMERALS 1 chain
2 end chain element
3 chain element
4 rotational spindle
5 toothed drive
6 rivet
7 synthetic material bushing
8 synthetic material disk
9 head of the rivet
11 latching fitting
12 connection plate
13 latching plate
14 detent pawl
15 spring
16 spindle or rivet
17 spindle or rivet
18 toothed drive
19 latching tooth
20 stop cam
21 engagement surface
22 disengagement lug
23 latching recess
24 bearing surface
25 sidewalls of the cover
26 stop
27 slots
28 edge
29 surface
30 tooth
31 toothed surface
32 toothed surface

The invention claimed is:

1. Link chain assembly, comprising:
a chain defined by a plurality of chain elements arranged in two or more adjacent rows of chain elements in a chain plane, wherein the chain elements of one of said adjacent rows are rotatably connected to the chain elements of the other of said adjacent rows, two rotational spindles connecting each of said chain elements of one of said rows with two different chain elements in the other of said rows, and wherein the chain elements of each of said rows are connected to each other by means of a toothed drive at adjacent ends of said chain elements, wherein the chain is flexible in the chain plane;
an actuator connected with one end of the chain with a toothed drive between the actuator and the chain;
wherein the actuator comprises one chosen from a pneumatic actuator, a hydraulic actuator, an electromotive actuator and a manual actuator;
wherein the actuator includes a latching fitting, wherein the latching fitting is provided with a connection plate that is adapted to be connected with a stationary member and a latching plate which is pivotally connected to said connection plate with a joint spindle, wherein said latching plate can be locked in various angular positions with respect to said connection plate, and wherein the toothed drive between the actuator and the chain comprises a toothed drive between said latching plate and one of said chain elements in one of said rows and a toothed drive between said stationary member and one of said chain elements in the other of said rows.

2. Link chain assembly as claimed in claim 1, wherein the actuator is in engagement with the chain elements such that said actuator and said chain elements are rotatable relative to each other.

3. Link chain assembly as claimed in claim 2, including a detent pawl which is rotatably mounted on the connection plate, wherein said detent pawl engages the latching plate in a latching position and disengages the latching plate in a disengaged position, and a stop cam provided on the latching plate which cooperates with a disengagement lug on the latching plate for disengaging the detent pawl.

4. Link chain assembly as claimed in claim 3, wherein the disengagement lug has a surface facing the stop cam.

5. Link chain assembly as claimed in claim 4, wherein said detent pawl is rotatably mounted to the connection plate with another rotational spindle and wherein the engagement surface is formed eccentrically with respect to the another rotational spindle.

6. Link chain assembly as claimed in claim 5, wherein the detent pawl includes a toothed engagement surface that engages a toothed surface of said latching plate.

7. Link chain assembly as claimed in claim 6, including a spring wherein the detent pawl includes a latching recess, into which the spring engages when the detent pawl is in the disengaged position, and holds the detent pawl in a fixed manner.

8. Link chain assembly as claimed in claim 7, wherein the detent pawl includes a bearing surface on a side facing away from the engagement surface, wherein the spring lies against said bearing surface when the detent pawl is in the engaged position.

9. Link chain assembly as claimed in claim 8, wherein the rotational spindle of the latching lug, the rotational spindle of the detent pawl and the rotational spindles of the chain elements are aligned when said link chain assembly is in one position.

10. Link chain assembly as claimed in claim 1, wherein the rotational spindles comprise a synthetic material disk and a synthetic material bushing.

11. Link chain assembly as claimed in claim 10, wherein at least one chosen from the synthetic material disk and synthetic material bushing are formed from elastic synthetic material.

12. Link chain assembly as claimed in claim 1, wherein the actuator comprises the electromotive actuator and wherein said electromotive actuator has an electromotively driven worm gear which effects an adjustment of the fixed last chain element latching plate relative to the connection plate.

13. Link chain assembly as claimed in claim 1, wherein the actuator has a self-locking action.

14. Link chain assembly as claimed in claim 1 in combination with a chair.

15. Link chain assembly as claimed in claim 14, wherein said chair comprises a reclining chair or a sofa.

16. Link chain assembly as claimed in claim 3, wherein the detent pawl includes a toothed engagement surface that engages a toothed surface of said latching plate.

17. Link chain assembly as claimed in claim 3, including a spring wherein the detent pawl includes a latching recess, into which the spring engages when the detent pawl is in the disengaged position, and holds the detent pawl in a fixed manner.

18. Link chain assembly as claimed in claim 3, wherein the detent pawl includes a bearing surface on a side facing away from the engagement surface, wherein the spring lies against said bearing surface when the detent pawl is in the engaged position.

19. Link chain assembly as claimed in claim 3, wherein the rotational spindle of the latching lug, the rotational spindle of the detent pawl and the rotational spindles of the chain elements are aligned when said link chain assembly is in one position.

20. Link chain assembly as claimed in claim 3, wherein the rotational spindles comprise a synthetic material disk and a synthetic material bushing.

\* \* \* \* \*